(12) United States Patent
Seyler et al.

(10) Patent No.: US 8,821,820 B2
(45) Date of Patent: Sep. 2, 2014

(54) COPPER/CHABAZITE-BASED CATALYST WITH IMPROVED CATALYTIC ACTIVITY FOR REDUCTION OF NITROGEN OXIDES

(75) Inventors: Michael Seyler, Rodenbach (DE); Nicola Soeger, Nidderau (DE); Katja Adelmann, Darmstadt (DE); Thomas R. Pauly, Clarkston, MI (US); Gerald Jeske, Neuberg (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 13/993,591

(22) PCT Filed: Dec. 14, 2011

(86) PCT No.: PCT/EP2011/072736
§ 371 (c)(1),
(2), (4) Date: Jun. 12, 2013

(87) PCT Pub. No.: WO2012/080318
PCT Pub. Date: Jun. 21, 2012

(65) Prior Publication Data
US 2013/0266497 A1    Oct. 10, 2013

(30) Foreign Application Priority Data
Dec. 16, 2010    (EP) .................................... 10015703

(51) Int. Cl.
| | | |
|---|---|---|
| *B01J 29/00* | (2006.01) | |
| *B01J 29/76* | (2006.01) | |
| *B01D 53/56* | (2006.01) | |
| *B01D 53/94* | (2006.01) | |
| *B01J 29/072* | (2006.01) | |
| *B01J 29/85* | (2006.01) | |
| *B01J 37/08* | (2006.01) | |

(52) U.S. Cl.
CPC .............. *B01J 29/85* (2013.01); *B01J 2229/40* (2013.01); *B01J 29/072* (2013.01); *B01J 29/763* (2013.01); *B01J 37/08* (2013.01); *B01D 53/9413* (2013.01); *B01D 2255/50* (2013.01); *B01D 2255/20761* (2013.01); *B01J 2229/18* (2013.01); *B01D 53/9418* (2013.01)
USPC ......... 423/213.2; 423/239.2; 502/60; 502/64; 502/345; 60/299; 60/301

(58) Field of Classification Search
USPC ................ 502/60, 64, 345; 423/213.2, 239.2; 60/299, 301
See application file for complete search history.

(56) References Cited

U.S. PATENT DOCUMENTS

| | | |
|---|---|---|
| 4,735,930 A | 4/1988 | Gerdes et al. |
| 4,874,590 A | 10/1989 | Staniulis et al. |
| 6,221,324 B1 | 4/2001 | Coq et al. |
| 7,220,692 B2 | 5/2007 | Marshall et al. |
| 7,601,662 B2 | 10/2009 | Bull et al. |
| 8,404,203 B2 | 3/2013 | Bull et al. |
| 2007/0081934 A1 | 4/2007 | Hubig et al. |
| 2009/0087367 A1 | 4/2009 | Liu et al. |
| 2009/0196812 A1 | 8/2009 | Bull et al. |
| 2011/0165051 A1* | 7/2011 | Beutel et al. ............... 423/239.2 |
| 2011/0281720 A1* | 11/2011 | Andersen et al. ............... 502/34 |
| 2013/0251611 A1* | 9/2013 | Wen et al. .................. 423/213.5 |
| 2013/0280160 A1* | 10/2013 | Ariga et al. .................... 423/704 |

FOREIGN PATENT DOCUMENTS

| | | |
|---|---|---|
| EP | 0 234 441 A2 | 9/1987 |
| WO | 2005/088091 A1 | 9/2005 |
| WO | 2008/106519 A1 | 9/2008 |

OTHER PUBLICATIONS

Leandro Martins, et al., "Cu and Co Exchanged ZSM-5 Zeolites-Activity Towards NO Reduction and Hydrocarbon Oxidation", 2006, Quin. Nova, vol. 29, No. 2, pp. 223-229 (XP-002641780).
C. Torre-Abreu, et al., "Characterization of CuMFI catalyst by temperature programmed desorption of NO and temperature programmed reduction. Effect of zeolite Si/Al ratio and copper loading", Applied Catalysis B: Environmental, 1997, vol. 12, pp. 249-262 (XP-002094744).
Stanislaw Dzwigaj, et al., "Incorporation of Copper in SiBEA Zeolite as Isolated Latice Mononuclear Cu(II) Species and its Role in Selective Catalytic Reduction of NO by Ethanol", Catalysis Letters, 2008, vol. 126, No. 1-2, pp. 36-42 (XP-055000589).
Tatsumi Ishihara, et al., "Copper Ion-Exchanged SAPO-34 as Thermostable Catalyst for Selective Reduction of NO with $C_3H_6$", Journal of Catalysis, 1997, vol. 169, pp. 93-102 (XP-002603636).
Ramón Moreno-Tost, et al., "Selective catalytic reduction of nitric oxide by ammonia over Cu-exchanged Cuban natural zeolites", Applied Catalysis B: Environmental, 2004, vol. 50, pp. 279-288.
International Search Report for Application No. PCT/EP2011/072736 dated Apr. 10, 2012.

\* cited by examiner

*Primary Examiner* — Timothy Vanoy
(74) *Attorney, Agent, or Firm* — Smith, Gambrell & Russell, LLP.

(57) ABSTRACT

A process for improving catalytic activity of a copper-promoted zeolitic catalyst with a chabazite structure, the copper-promoted zeolitic catalyst having a temperature-programmed reduction (TPR) signal in a temperature range from 230° C. to 240° C. as examined in a TPR with a test gas having a hydrogen content of 5% by volume, a heating rate of 10 K/min, and a catalyst sample weight containing from 3 to 8 milligrams of copper calculated as metal.

8 Claims, 6 Drawing Sheets

Figure 1:
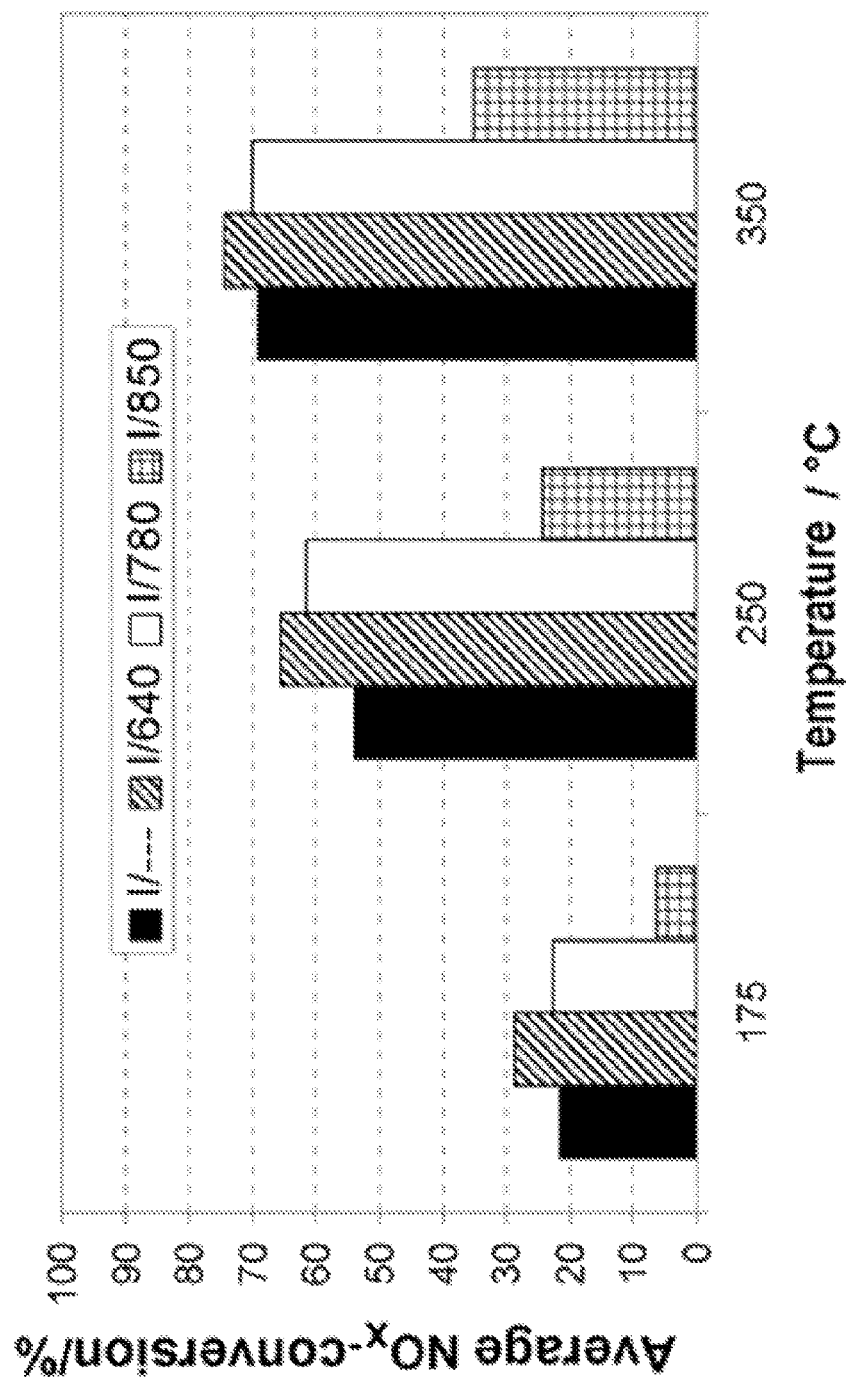

COPPER/CHABAZITE-BASED CATALYST WITH IMPROVED CATALYTIC ACTIVITY FOR REDUCTION OF NITROGEN OXIDES

The invention relates to a catalyst which is based on zeolites or zeolite-like compounds having a chabazite structure and has improved catalytic activity, a method of producing it and its use.

The exhaust gas from diesel engines contains not only the pollutant gases carbon monoxide (CO) and hydrocarbons (HC) resulting from incomplete combustion of the fuel but also soot particles (PM) and nitrogen oxides ($NO_x$). In addition, the exhaust gas from diesel engines contains up to 15% by volume of oxygen, it is known that the oxidizable pollutant gases CO and HC can be converted into carbon dioxide ($CO_2$) by passage over a suitable oxidation catalyst and particles can be removed by passing the exhaust gas through a suitable particulates filter. Technologies for removing nitrogen oxides from exhaust gases in the presence of oxygen are also well known in the prior art. One of these "nitrogen oxide removal processes" is the SCR process (SCR=Selective Catalytic Reduction), i.e. the selective catalytic reduction of the nitrogen oxides by means of the reducing agent ammonia over a catalyst suitable for this purpose, viz. the SCR catalyst. Here, ammonia can be introduced into the exhaust gas stream either as such or in the form of a precursor compound which can be decomposed under ambient conditions into ammonia, where "ambient conditions" is the environment of the compound which can be decomposed into ammonia in the exhaust gas stream upstream of the SCR catalyst. To carry out the SCR process, a source for providing the reducing agent, an injection device for appropriate metering of the reducing agent into the exhaust gas and an SCR catalyst arranged in the flow path of the exhaust gas are necessary. The totality of reducing agent source, SCR catalyst and injection device arranged upstream of the SCR catalyst is also referred to as SCR system.

To purify the diesel exhaust gases in motor vehicles, the SCR system is usually used in combination with other exhaust gas cleaning facilities such as oxidation catalysts and diesel particle filters. This gives many different possibilities for configuration of the exhaust gas system. Depending on the installation position of the SCR system and in particular depending on the arrangement of the SCR catalyst in the flow path of the exhaust gas, the performance and aging stability of the catalyst have to meet different requirements. Consequently, many SCR catalysts which are suitable for reducing the nitrogen oxide content in the exhaust gas from diesel engines and are usually optimized according to the specific requirements of the respective exhaust gas system configuration have been described in the prior art.

EP 0 234 441 A2 discloses a catalyst for the selective catalytic reduction of $NO_x$ to form nitrogen in the presence of ammonia, which consists of from 5 to 50% by weight of zirconium oxide starting material having a specific surface area of at least 10 m²/g, from 50 to 90% of one or more zeolites in the hydrogen or ammonium form and from 0 to 30% of binder. As zeolites, preference is given to clinoptilolite, optionally in admixture with chabazite. Furthermore, the catalyst can contain vanadium oxide and/or copper oxide as promoters.

U.S. Pat. No. 4,874,590 discloses a process for reducing the amount of nitrogen oxides and also sulfur oxides in gas streams catalytically by passing the gas stream together with ammonia over a microporous, nonzeolitic molecular sieve. This molecular sieve is preferably selected from the group consisting of SAPOs, ELAPSOs, AlPOs, MeAlPOs, FeAPOs, TAPOs, ELAPOs and MeAPSOs. Metal ions selected from among Cu, Co, V, Cr, W, Ni, Pd, Pt, Mn, Mo, Rh, Mg, Al and Fe can be exchanged into the molecular sieve, with particular preference being given to using Cu as exchange ion. The nonzeolitic molecular sieve composition is optionally present in supported form in an inorganic, oxidic matrix; use is usually made of amorphous, catalytically active, inorganic oxides such as silica/alumina, alumina, $SiO_2$, $Al_2O_3$, mixed oxides of $SiO_2$ with $Al_2O_3$, $ZrO_2$, MgO, thorium oxide, beryllium oxide, Si—Al—Th mixed oxides, Si—Al—Zr mixed oxides, Al—B mixed oxides, aluminum titanates and the like.

WO 2005/088091 A1 discloses a process for the reduction of nitrogen oxides in diesel exhaust gases using fuel (hydrocarbons) instead of ammonia or a compound which can be decomposed into ammonia as reducing agent. In this process, a catalyst which contains an $NO_x$-absorbing material and an $NO_x$-reducing material is used. Both materials are selected from the group consisting of natural, synthetic, ion-exchanging, non-ion-exchanging, modified, unmodified, "pillared", non-"pillared", clay minerals, sepiolites, attapulgites, natural, synthetic, ion-exchanging, non-ion-exchanging, modified, unmodified, zeolites, Cu-, Ba-, K-, Sr- and Ag-loaded, Al-, Si- and Ti-"pillared" montmorillonites, hectorites doped with Fe, In, Mn, La, Ce or Cu and mixtures thereof, Cu-, Fe-, Ag-, Ce-loaded clinoptilolites and mixtures thereof, in preferred embodiments, blends of zeolites with clay minerals and copper are used as catalytically active component.

U.S. Pat. No. 7,220,692 likewise discloses a catalyst which is suitable for the reduction of nitrogen oxides in lean-burn combustion exhaust gases using hydrocarbons as reducing agent. This catalyst is A functional and combines active, metal-exchanged molecular sieves with a separate stabilizing metal oxide phase which is produced from a sol precursor compound as coating over the molecular sieve particle and brings about improved hydrothermal stability while at the same time retaining the low-temperature $NO_x$ reduction activity. As metal-exchanged molecular sieves, preference is given to using those whose pore sizes are at least 4 Ångstrom (zeolite Y, zeolite β, mordenite, ferrierite, ZSM-5, ZSM-12) and which contain one or more of the transition metals Cu, Co, Fe, Ag and Mo as promoters.

A Cu-promoted ZSM-5 zeolite which can be used in the selective catalytic reduction of NO by means of methane or propane (SCR-HC) under oxidative conditions and in the temperature-programmed reduction (TPR) by means of hydrogen has peaks at 240 and 305° C. (test conditions: heating rate 10° C./min, test gas 5.1% of $H_2$ in $N_2$ (v/v) at 30 ml/min) is known from L. Martens et al. "Cu and Co exchanged ZSM-5 zeolites—activity towards no reduction and hydrocarbon oxidation" in Quirn. Nova, vol. 29, No. 2, pages 223-229, 2006.

The documents cited show that the use of copper-exchanged zeolites and zeolite-like compounds as SCR catalysts is known in the prior art. The use of copper-exchanged, small-pored zeolites such as chabazite (CHA) or corresponding zeolite-like compounds such as silicon aluminum phosphate having a chabazite structure (SAPO-34), in particular, have recently been in the focus of SCR catalyst development since these compounds display a good $NO_x$ conversion activity at temperatures up to 300° C. together with excellent resistance to, usually reversible, blockages due to hydrocarbon compounds (HC) which are likewise present in the exhaust gas.

It was an object of the invention to provide an SCR catalyst having improved catalytic activity without the abovementioned advantages of the copper-exchanged chabazite or SAPO-34 catalysts being impaired.

The inventors have now surprisingly found that the catalytic activity of the copper-promoted zeolitic catalysts having a chabazite structure can be influenced in a targeted manner by thermal pretreatment under oxidizing conditions, for example by means of calcination in air. Particularly strongly reduction-catalytically active sites which can be recognized by a TPR peak in the temperature range from 230° C. to 240° C. when the corresponding TPR measurement is carried out at a heating rate of 10 K/min using a test gas having a hydrogen content of 5% by volume and using an amount of sample containing from 3 to 8 milligram of copper, calculated as metal, are obviously formed under suitable calcination conditions.

The present invention accordingly provides a method of improving the catalytic activity of a copper-promoted zeolitic catalyst having a chabazite structure, which is characterized in that a zeolitic catalyst having a chabazite structure is treated with a copper salt solution and subsequently treated thermally under oxidizing conditions in order to form the copper-promoted zeolitic catalyst having a chabazite structure which in the temperature-programmed reduction (TPR) by means of hydrogen at a heating rate of 10 K/min and a hydrogen content in the test gas of 5% by volume has a signal in the temperature range from 230° C. to 240° C., where the weight used in the TPR is such that the sample to be examined contains from 3 to 8 milligram of copper calculated as metal.

The invention further provides a copper-promoted zeolitic catalyst having a chabazite structure which can be obtained by the above-described method, and also a process for the reduction of nitrogen oxides in an exhaust gas stream, which is characterized in that a copper-promoted zeolitic catalyst having a chabazite structure is brought into contact with the $NH_3$-containing exhaust gas stream.

The term temperature-programmed reduction (TPR) refers to a method of examining the reducibility or the thermal behavior of solids, for example catalytically active materials, opposite hydrogen as a function of the temperature. The solid or catalyst to be examined is firstly dried at 110° C. in a drying oven to remove adhering moisture and then weighed warm into a sample vessel, which can be, for example, a simple U-tube. This sample vessel is positioned in an oven equipped with temperature regulation, in addition, a thermocouple records the temperature in the bed of solid. The sample vessel can firstly have an inert gas (nitrogen, argon) passed through it at slightly elevated temperature in order to remove the air present. After a few minutes, hydrogen is introduced into the pure inert gas stream by means of flow regulators (for example 10% by volume of hydrogen in nitrogen). In the studies described in this text, the sample vessel was flushed with measurement gas (5% by volume of hydrogen in argon) for a time of 5 minutes at room temperature before commencement of the measurement. The sample is then heated in a defined way in the oven. The heating rates are usually in the range from 1 K/min to 20 K/min. The hydrogen content still present downstream of the sample vessel is measured by means of suitable detectors (thermal conductivity detector, mass spectrometer) and recorded, if hydrogen has been consumed, the hydrogen concentration measured in the gas breaking through is below the initial value of, for example, 5% by volume of hydrogen and a reduction process has taken place at the temperature just reached.

To evaluate the results of a TPR study, the hydrogen consumption is presented as a function of temperature. Information about the number of reduction processes can be derived from the resulting graph which possibly has a plurality of peaks. A carefully carried out measurement also allows quantitative determination of the hydrogen consumption and thus (if the amount of substance weighed in is known) a determination of the degree of reduction. Even when the measurement cannot be quantified or the peaks obtained cannot be assigned unambiguously to the possible reduction processes, the TPR study allows a plurality of samples to be compared in terms of their thermal behavior, in this respect, the result of the TPR with regard to the position of the peaks is characteristic of the material examined and reproducible when the heating rates [in K/min], the amount of substance weighed in [in gram] and the hydrogen content of the test gas [in % by volume] are kept constant.

For the purposes of the present invention, the term "zeolitic catalyst having a chabazite structure" refers to both naturally occurring and synthetically produced zeolites of the chabazite type and also zeolite-like compounds which have the chabazite structure type. Zeolite-like compounds differ from zeolites in that the cage structure is not made up exclusively of aluminum and silicon framework atoms but rather these are partly replaced by other trivalent, tetravalent and/or pentavalent ions such as $P^{3+}$, $P^{5+}$, $Ga^{3+}$, $In^{3+}$, $As^{3+}$, $Cr^{3+}$, $Fe^{3+}$, $V^{3+}$, $Ge^{4+}$, $Ti^{4+}$, $Zr^{3+}$. In practice, aluminum and/or silicon framework atoms are most frequently replaced by phosphorus atoms, for example in the silicon aluminum phosphates or in the aluminum phosphates which crystallize in zeolite structure types. Zeolite-like compounds which are suitable for the purposes of the present invention are the silicon aluminum phosphate crystallizing in the chabazite structure SAPO-34 and the aluminum phosphate crystallizing in the chabazite structure ALPO-34.

Preferred zeolitic catalysts having the chabazite structure are SAPO-34 and chabazite (CHA).

As copper salt solution with which the zeolitic catalyst having a chabazite structure is treated, preference is given to using a compound selected from among copper(II) sulfate, copper(II) nitrate, copper(II) acetate and copper(II) acetylacetonate dissolved in water and/or a polar solvent selected from the group consisting of acetylacetone, alcohols having from 1 to 3 carbon atoms, acetonitrile, acetone, dimethyl sulfoxide (DMSO), methyl ethyl ketone and mixtures thereof. Alcohols having from one to three carbon atoms are, in particular, methanol, ethanol and propanol. Particular preference is given to a solution of copper(II) sulfate and/or copper(II) nitrate and/or copper(II) acetate in water.

Concentration and amount of the copper salt solution used for the liquid ion exchange are preferably selected so that the copper compound is present in amounts of from 0.1 to 20% by weight, calculated as copper and based on the total amount of copper and zeolitic catalyst having a chabazite structure, in the resulting copper-promoted zeolitic catalyst having a chabazite structure. The amount of copper is preferably from 1 to 5% by weight, particularly preferably from 1.5 to 3.5% by weight, in each case calculated as copper and based on the total amount of copper and zeolitic catalyst having a chabazite structure. Examples are, in particular, 2, 2.5, 3 and 3.5% by weight, in each case calculated as copper and based on the total amount of copper and zeolitic catalyst having a chabazite structure.

The thermal treatment under oxidizing conditions is preferably carried out by calcination in air in the temperature range from 600° C. to 900° C., particularly preferably in the temperature range from 600° C. to 800° C. and very particularly preferably in the temperature range from 630° C. to 790° C.

If copper-promoted SAPO-34 is subjected to the method of the invention, the formation of the obviously particularly strongly reduction-catalytically active sites can be recognized by a TPR peak at 240° C. when the temperature-programmed reduction is carried out at a heating rate of 10 K/min, a hydrogen content in the test gas of 5% by volume and using a sample weight which is such that it contains from 3 to 8 milligram of copper calculated as metal.

If copper-promoted chabazite (CHA) is subjected to the method of the invention, the formation of the obviously particularly strongly reduction-catalytically active sites can be recognized by a TPR peak at 230° C. when the temperature-programmed reduction is carried out at a heating rate of 10 K/min, a hydrogen content in the test gas of 5% by volume and using a sample weight which is such that it contains from 3 to 8 milligram of copper calculated as metal.

Figure 2:
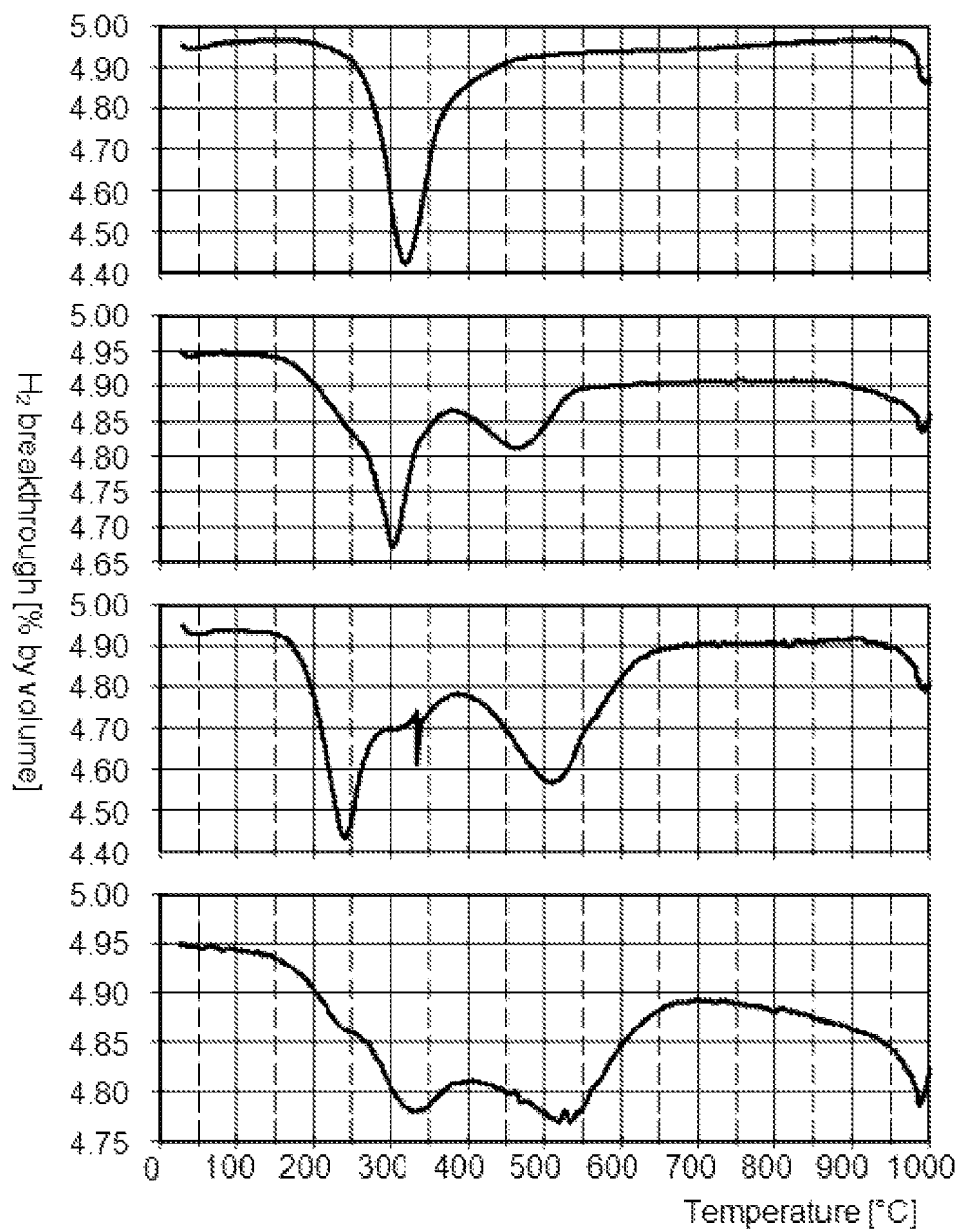
Figure 3:
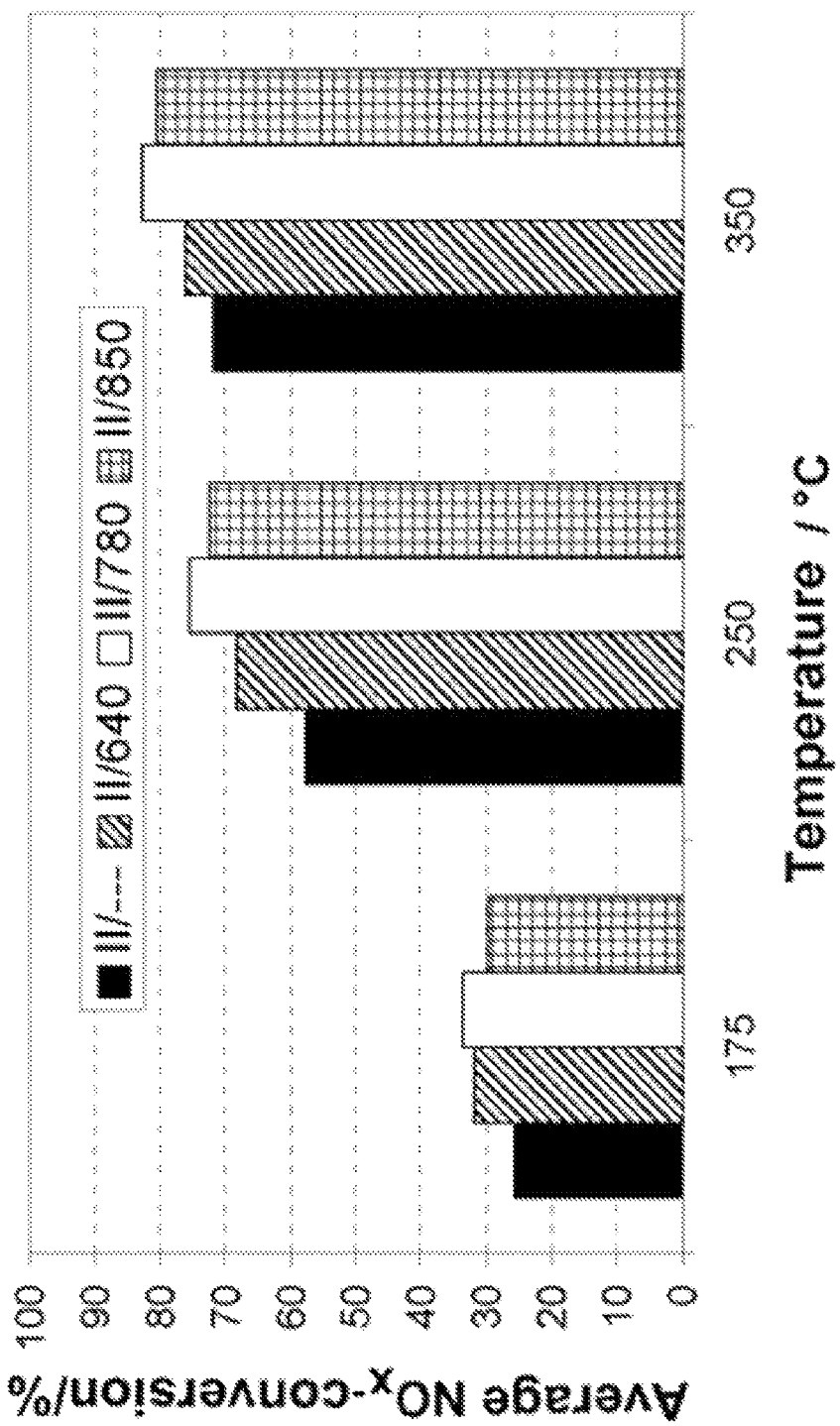
Figure 4:
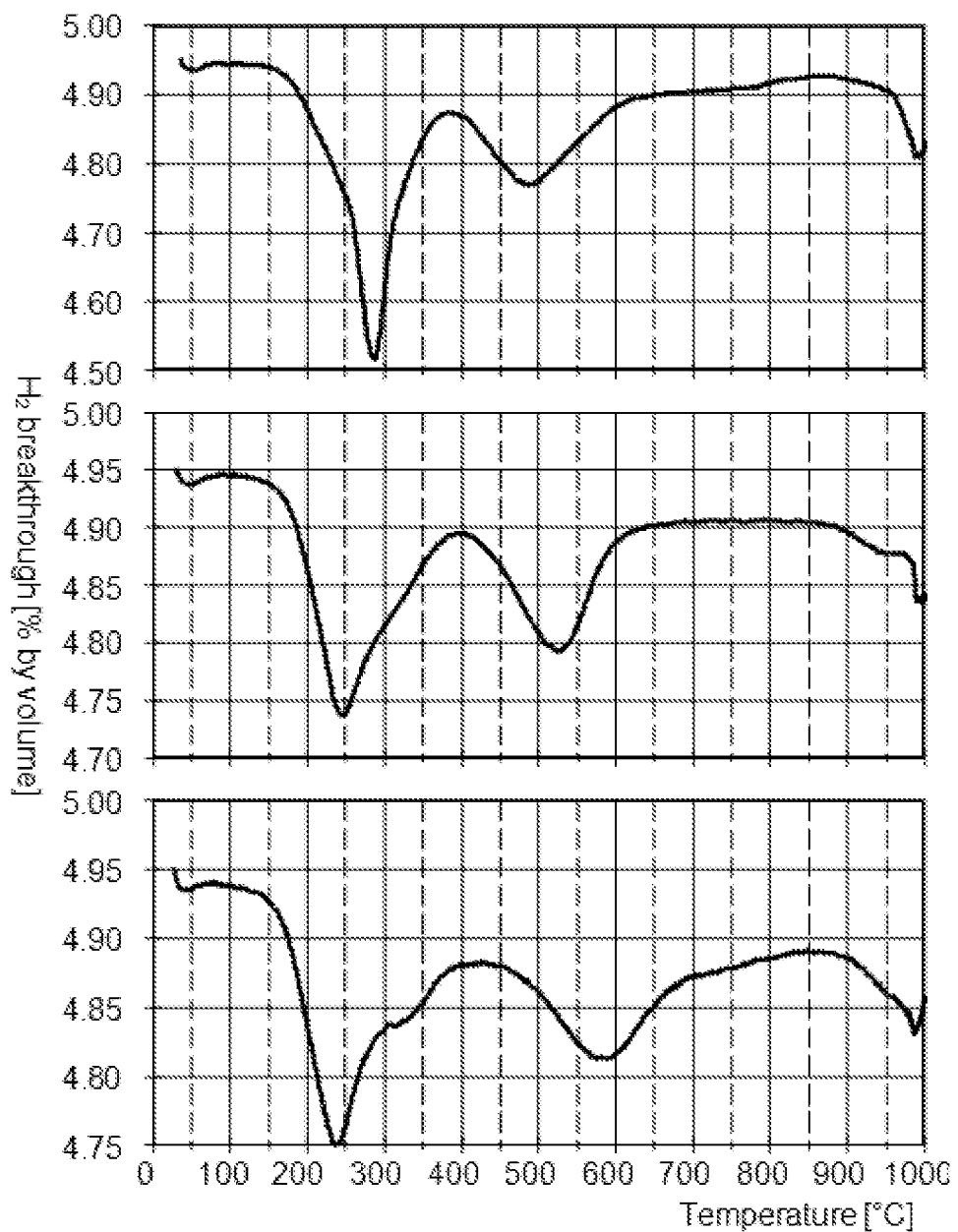
Figure 5:
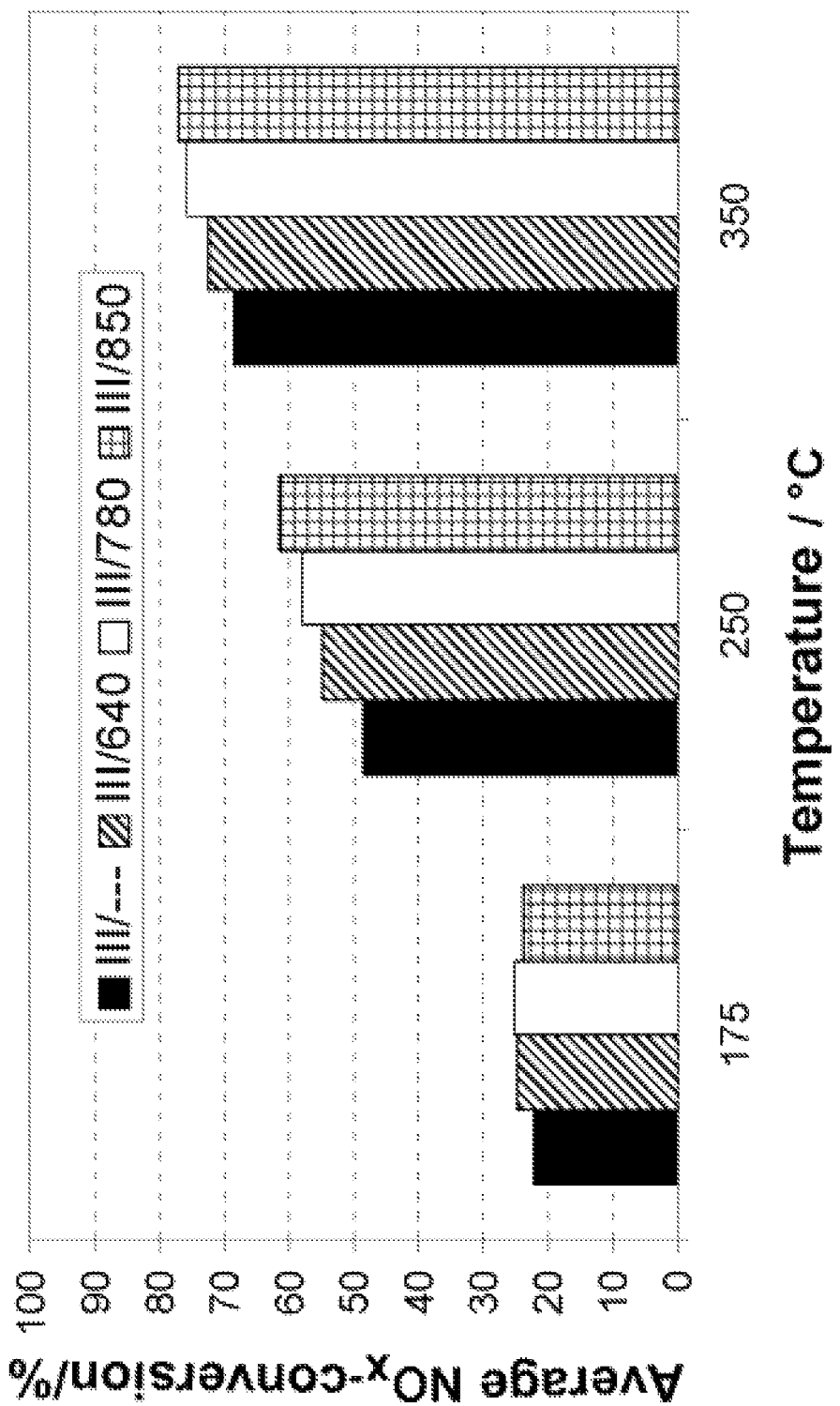
Figure 6:
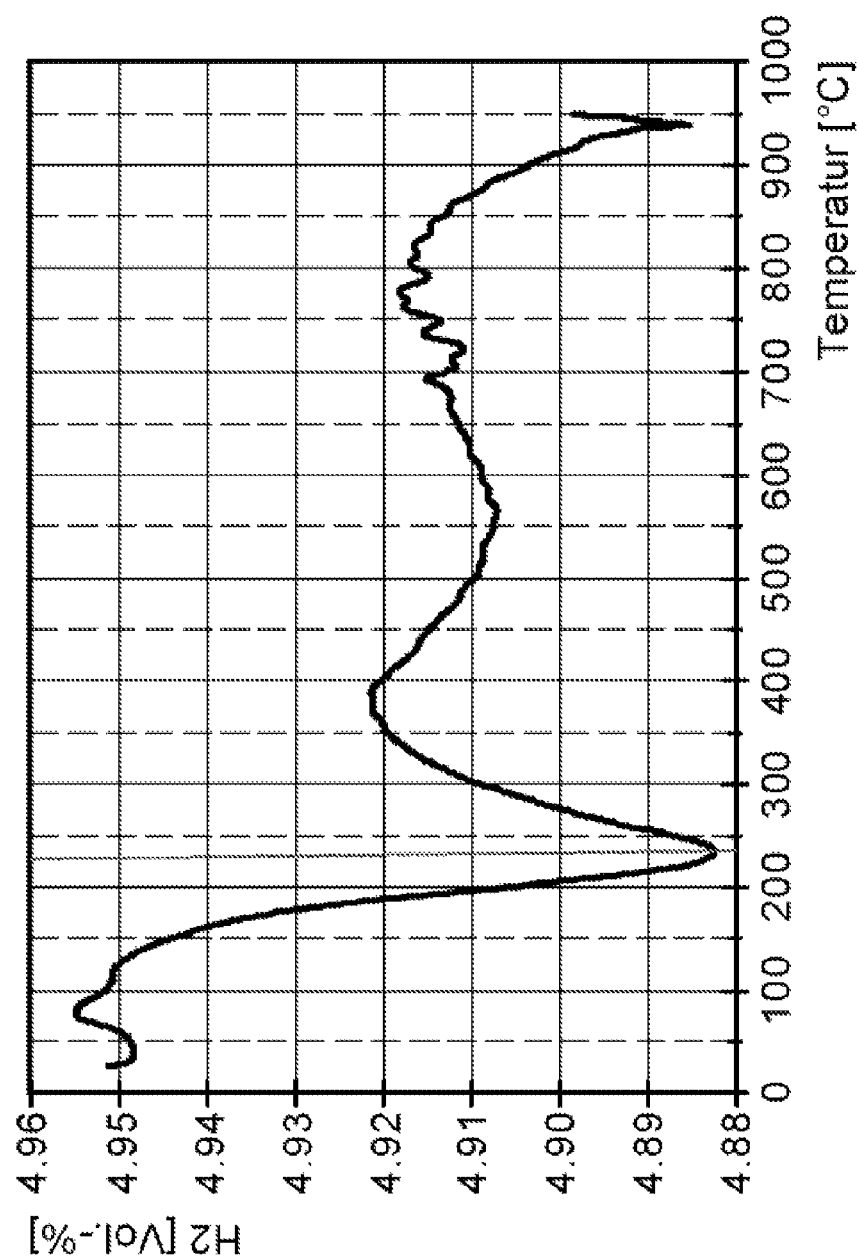

The invention is illustrated below with the aid of examples and figures. The figures show:

FIG. 1: average $NO_x$ conversion over an uncalcined comparative sample (I/ - - -) and over inventive copper-promoted zeolitic catalysts having a chabazite structure (I/640; I/780; I/850);

FIG. 2: TPR graphs (from the top downward) of an uncalcined comparative sample (I/ - - -) and of inventive, copper-promoted zeolitic catalysts having a chabazite structure (I/640; I/780; I/850);

FIG. 3: average $NO_x$ conversion over an uncalcined comparative sample (II/ - - -) and over inventive, copper-promoted zeolitic catalysts having a chabazite structure (II/640; II/780; II/850);

FIG. 4: TPR graphs (from the top downward) of inventive, copper-promoted zeolitic catalysts having a chabazite structure (II/640; II/780; II/850);

FIG. 5; average $NO_x$ conversion over an uncalcined commercial comparative catalyst (II/ - - -) and over uncalcined embodiments according to the invention (III/640; III/780; III/850);

FIG. 6: TPR graph of a copper-promoted, zeolitic catalyst for the production of which a chabazite (CHA) was used.

The influence of the calcination conditions on the catalytic activity of the resulting copper-promoted zeolitic catalysts having a chabazite structure and the formation of the obviously particularly strongly reduction-catalytically active sites was examined in a study described in the following examples. For this purpose, samples of copper-promoted zeolitic catalyst having a chabazite structure, which were treated oxidatively under various conditions, were produced in powder form in examples 1 and 2. The production of these samples is described in detail below.

A partial amount of the samples obtained in powder form from examples 1 and 2 was examined to determine its behavior in the temperature-programmed reduction by means of hydrogen. The BET surface area of the powders was determined on a further partial amount. The corresponding measurement conditions are indicated below.

A third partial amount of the samples from examples 1 and 2 was suspended in water and admixed with silica sol as binder to produce a supported catalyst, with the amount of the silica sol added being calculated so that the resulting catalyst contained from about 10 to 15% by weight of $SiO_2$ resulting therefrom, based on the total amount of the catalytically active coating. The suspension obtained in this way was milled and used for coating a cylindrical, ceramic flow-through honeycomb body having a diameter of 92.2 millimeter and a length of 78.2 millimeter, with the honeycomb body having 62 cells per square centimeter and a cell wall thickness of 0.165 millimeter. The coated honeycomb body was dried and heated at 350° C. for a time of 2 hours.

Drill cores were taken from the catalysts produced in this way in order to examine their catalytic activity. These test specimens had a diameter of 25.4 mm and a length of 78.2 mm. The activity of the catalysts was examined in a dynamic activity test in a laboratory model gas plant. The test conditions are described below.

Temperature-Programmed Reduction by Means of Hydrogen: Measurement Conditions

The method of temperature-programmed reduction by means of hydrogen has been described above. The following measurement conditions were selected;

| | |
|---|---|
| Measuring instrument: | Micromeritics Instrument Corp. Autochem II 2920 |
| Sample vessel: | U-tube-shaped glass wall reactor |
| | Sample leg diameter, internal: 9.25 millimeter |
| | Sample leg diameter, external: 11.98 millimeter |
| | Tube length to beginning of cone: 165 millimeter |
| | Length of the cone: 19 millimeter |
| | Cone diameter, external: 6.1 millimeter |
| | Total length incl. bend: 199 millimeter |
| | Counter-leg diameter, external: 6.1 millimeter |
| | Counter-leg diameter, internal: 2.1 millimeter |
| | Leg spacing in middle: 28 millimeter |
| | Total length of the U-tube: 199 millimeter |
| Thermocouple: | Type K nickel-chromium/nickel-aluminum |
| Temperature range: | RT to 1000° C. |
| Heating rate: | 10 K/min |
| Measurement gas: | 5% by volume of $H_2$ in argon |
| Detector: | Thermal conductivity detector TCD |
| Amount of sample: | corresponds to from 3 to 8 milligram of copper calculated as metal |
| Sample treatment: | Drying at 110° C. in a drying oven |
| | Weighed in in the hot state. |

Examination of the BET Surface Area: Measurement Conditions

The determination of the BET surface area is an analytical method for determining the size of surfaces, in particular of porous solids, by means of gas adsorption. It is a method of surface chemistry by means of which the mass-based specific surface area is calculated from experimental data. "BET" is derived from the surnames of the developers of the BET model, viz. Stephen Brunauer, Paul Hugh Emmett and Edward Teller.

The determination of the specific surface area was carried out using the customary methods known to those skilled in the art. Before the measurement the samples were degassed by treatment under reduced pressure at 400° C. for a period of one hour.

Dynamic Activity Test: Test Conditions

The dynamic activity test was carried out on supported catalysts in a laboratory model gas plant. The following test gas compositions were set:

| | Gas mixture | | |
|---|---|---|---|
| Constituent | Gas mixture 1 | Gas mixture 2 | Gas mixture 3 |
| $O_2$ [% by volume]: | 10 | 10 | 10 |
| NO [vppm]: | 500 | 500 | 0 |
| $NH_3$ [vppm]: | 0 | 750 | 0 |
| CO [vppm]: | 350 | 350 | 350 |
| $C_3H_6$ [vppm]: | 100 | 100 | 100 |
| $H_2O$ [vppm]: | 5 | 5 | 5 |
| $N_2$ [% by volume]: | Balance | Balance | Balance |
| Space velocity [$h^{-1}$] | 60 000 | 60 000 | 60 000 |

The test was carried out at three different temperatures matched to the most use-relevant target temperature range for an SCR system installed downstream of other exhaust gas purification facilities in an exhaust gas system, namely 175° C., 250° C. and 300° C. At each temperature, a cycle of four different phases, hereinafter referred to as phases A to D, was carried out:

| | |
|---|---|
| Phase A: | Gas mixture 1; duration: 5 minutes |
| Phase B: | NH$_3$-SCR phase: |
| | Gas mixture 2: duration: up to an NH$_3$ breakthrough of 20 vppm or stoppage according to time; |
| Phase C: | Gas mixture 3; emptying of the NH$_3$ store by means of a temperature ramp up to 500° C.; |
| Phase D: | Gas mixture 3; setting of the next measurement temperature |

Within a cycle, the catalyst temperature was firstly set to the defined target temperature. The catalyst was then supplied with gas mixture 1 for 5 minutes (phase A). In phase B, the gas was changed over to gas mixture 2 in order to determine the NH$_3$-SCR conversion. This phase was either stopped on detection of an NH$_3$ breakthrough of 20 vppm or ended according to a previously laid down time criterion. Gas mixture 3 was then supplied and the catalyst was heated to 500° C. in order to empty the ammonia store (phase C). The catalyst was subsequently cooled down to the next measurement temperature to be examined (phase D), and the next cycle commenced with phase A by introduction of gas mixture 1 after setting the target temperature.

The dynamic NO$_x$ conversion was determined for all three measurement temperatures from the concentrations of the corresponding exhaust gas components upstream and downstream of the catalyst determined during phase B. For this purpose, an average NO$_x$ conversion over this phase was calculated taking the N$_2$O formation into account, as follows:

$$Conv._{average, N_2Ocorr} = \left[1 - \frac{c^{downstream\ of\ cat}_{NO_x, average} + 2 \cdot c^{downstream\ of\ cat}_{N_2O, average}}{c^{upstream\ of\ cat}_{NO_x, average} + 2 \cdot c^{upstream\ of\ cat}_{N_2O, average}}\right] \cdot 100\%$$

Example 1

Pulverulent samples of inventive, copper-promoted zeolitic catalysts having a chabazite structure which were calcined under different conditions were produced. For this purpose, commercially available silicon aluminum phosphate SAPO-34 was suspended in water. Whilst stirring, copper(II) nitrate solution was added to the suspension. The amount of copper nitrate solution added was calculated so that the finished pulverulent catalyst material contained 3% by weight of Cu, based on the total weight of the catalyst material. To complete the ion exchange, the suspension was stirred for half an hour and then introduced into a hot gas stream at 625° C. in the combustion chamber of a turbulent burner, with the solvent of the suspension vaporizing during a residence time of the suspension in the hot gas stream of less than one minute. The solid obtained was conveyed together with the hot gas stream through an adjoining resonance tube at an average temperature of 622° C. and then separated off from the gas stream in a precipitator.

The powder obtained in this way was divided into four partial amounts. Each of the partial amounts was calcined at 640° C. or at 780° C. or at 850° C. in a furnace for a time of 2 hours. A total of four powders were thus obtained:
  Powder I/- - - : as produced; without additional calcination
  Powder I/640: additional calcination at 640° C.
  Powder I/780: additional calcination at 780° C.
  Powder I/850: additional calcination at 850° C.

All four powders were examined in the temperature-programmed reduction by means of hydrogen using the method indicated above. In addition, the BET surface areas of the powders were determined and catalysts for examination of the catalytic activity were produced by the method described above.

The following table shows the measured BET surface areas of the powders.

| Powder: | I/— | I/640 | I/780 | I/850 |
|---|---|---|---|---|
| BET in m$^2$/g: | 547 | 585 | 507 | 133 |

While the calcinations at 640° C. and 780° C. obviously have no significant influence on the BET surface area, a significant decrease in the surface area is observed after calcination at 850° C. The thermal stability of the material produced by the above process is not sufficient to survive a calcination at 850° C. without damage.

The decrease in the BET surface area after calcination at 850° C. is expected to lead to a significant decrease in the catalytic activity, which is also observed in actual practice. FIG. 1 shows the results of the determination of the catalytic activity of the catalysts produced from the powders. As expected, the powder I/850 calcined at 850° C. shows significantly poorer nitrogen oxide conversions in the SCR reaction than freshly produced, uncalcined powder I/ - - - at all temperatures.

Surprisingly, a sometimes very significant improvement in the catalytic activity in the SCR reaction compared to the freshly produced, not after-treated powder I/ - - - is found at all temperatures for the powders I/640 and I/780 which have been after-calcined at 640° C. and 780° C. Particularly at a measurement temperature of 250° C., the calcination brings about a significant improvement in the NO$_x$ conversion. In relative terms, the NO$_x$ conversion is improved by 21.5% by the after-calcination at 840° C., and by 14% by the after-calcination at 780° C.

The after-calcination of the catalyst at 640° C. or 780° C. obviously brings about formation of particularly reduction-catalytically active species. As can be seen from the TPR graph in FIG. 2, a TPR peak at 240° C. is produced by the calcination.

FIG. 2 shows (from the top downward) firstly the TPR graph for the freshly produced, uncalcined powder I/ - - - and then, in this order, the TPR graphs of the powders I/640, I/780 and I/850. It can clearly be seen that the freshly produced, uncalcined powder displays no TPR signal at 240° C., but this is characteristic in the powder I/780 which has been after-calcined at 780° C. In the case of the sample which has been after-calcined at 640° C., the incipient formation of the obviously strongly reduction-catalytically active species can be seen from a corresponding shoulder at 240° C. which is superimposed by a TPR signal at 300° C. or 320° C. The signal at the higher temperature obviously indicates less reduction-catalytically active sites. Only this signal is present in the freshly produced sample and is very strongly pronounced. It disappears completely in the sample calcined at 780° C. it is to be expected that in the case of powder samples which are calcined in a temperature range from 640° C. to 780° C. a double peak occurs in the range from 240° C. to 320° C. and indicates coexistence of the two reactive species. The TPR graph of the sample heated at 850° C. indicates, by means of the shoulder present at 240° C., that residues of the highly active species are still present. Since, however, the thermal stability of the material has been exceeded in this sample, as could already be seen from the decrease in the BET surface area, the sintering of the material shows a totally different picture of the reduction-catalytic activity, which is also reflected in the considerably poorer catalytic activity of the material in the SCR reaction.

Example 2

Pulverulent samples of inventive, copper-promoted zeolitic catalysts which were calcined under different conditions were produced. For this purpose, commercially available silicon aluminum phosphate SAPO-34 was suspended in water. Whilst stirring, copper(II) nitrate solution was added to the suspension. The amount of copper nitrate solution added was calculated so that the finished catalyst contained 3% by weight of Cu, based on the total weight of the exchanged zeolite-like compound. To complete the ion exchange, the suspension was stirred for half an hour and then introduced into a hot gas stream at 500° C. in the combustion chamber of a turbulent burner, with the solvent of the suspension vaporizing during a residence time of the suspension in the hot gas stream of less than one minute. The solid obtained was conveyed together with the hot gas stream through an adjoining resonance tube at an average temperature of 505° C. and then separated off from the gas stream in a precipitator.

The powder obtained in this way was divided into four partial amounts. Each of the partial amounts was calcined at 640° C. or at 780° C. or at 850° C. in a furnace for a time of 2 hours. A total of four powders were thus obtained:

Powder II/- - - - : as produced; without additional calcination

Powder II/640: additional calcination at 640° C.

Powder II/780; additional calcination at 780° C.

Powder II/850; additional calcination at 850° C.

As in example 1, the four powders obtained here were also examined in the temperature-programmed reduction by means of hydrogen by the method indicated, the BET surface areas of the powders were determined and catalysts were produced in order to examine the catalytic activity.

The following table shows the measured BET surface areas of the powders,

| Powder: | II/— | II/640 | II/780 | II/850 |
|---|---|---|---|---|
| BET in m²/g: | 665 | 685 | 660 | 625 |

It can be seen that although the BET surface area decreases as expected with increasing calcination temperature, the thermal stability of the material is not exceeded at any of the temperatures selected. The high active surface area of over 600 m²/g is thus retained in all powder samples examined.

FIG. 3 shows the results of the determination of the catalytic activity of the catalysts produced from the powders. All after-calcined powders show a significant improvement at all measurement points in the $NO_x$ conversion performance compared to the freshly produced powder II/ - - - which has not been after-calcined. In relative terms, the $NO_x$ conversion at 250° C. is improved by 18.3% by the after-calcination at 640° C., by 30.8% by the after-calcination at 780° C. and by 25.6% by the after-calcination at 850° C. The surprising improvement in the catalytic activity in the SCR reaction which was found in example 1 is thus confirmed.

The formation of an obviously strongly reduction-catalytically active species, which is recognizable by a TPR signal at 240° C., is also confirmed in the TPR measurements on the inventive catalyst powders produced in this experiment. FIG. 4 shows (from the top downward) the TPR graphs of the inventive powders II/640, II/780 and II/850 which have been after-calcined. As in the TPR graphs obtained in example formation commencing for the sample which has been after-calcined at 640° C. of the obviously strongly reduction-catalytically active species can be seen from a corresponding shoulder at 240° C. The samples which have been after-treated at 780° C. and 850° C. display the corresponding signal in very pronounced form.

In agreement with the increasing strength of the TPR signal at 240° C., the powders II/780 and II/850 display the highest catalytic activity at all temperature points examined, as can be seen from FIG. 3.

Example 3

In the following example, a check was made as to whether the relationship between the improvement in the catalytic activity of the catalysts by targeted thermal treatment under oxidative conditions can also be found in practice-relevant supported catalysts.

To produce corresponding supported catalysts, a coating suspension was firstly produced by suspending commercially available SAPG-34 in water and adding an aqueous copper (II) nitrate solution. The amount of copper nitrate solution added was calculated so that the finished catalyst contained 2% by weight of Cu, based on the total weight of the exchanged zeolite-like compound. To complete the ion exchange, the suspension was stirred for half an hour and then, after addition of silica sol as binder, applied directly to a ceramic flow-through honeycomb body having 62 cells per square centimeter and a cell wall thickness of 0.165 millimeter and a diameter of 92.96 millimeter and a length of 76.2 millimeter. The honeycomb body which has been coated in this way was dried at 350° C. in a stream of hot air.

Four drill cores having a diameter of 25.4 millimeter were taken from the catalyst produced in this way. A first drill core was calcined at 570° C. for a time of 2 hours, i.e. under conditions as are also usually selected in practice for the thermal pretreatment. This drill core III/ - - - is employed as a measure of the catalytic activity of commercially available Cu-SAPO-34 catalysts. One of each of the remaining three drill cores was calcined in air for a time of 2 hours at 640° C. (→drill core III/640) or at 780° C. (→drill core III/780) or at 850° C. (→drill core III/850).

The catalytic activity of these four drill cores was tested by the method described above. FIG. 5 shows the result. It is clear that the improvement in the catalytic activity is present in all powders which have been after-calcined.

Example 4

A chabazite (CHA) was used for producing a copper-promoted, zeolitic catalyst, it was produced by the method of the invention. The copper content was 2.3% by weight calculated as copper and based on the total amount of copper and chabazite. As in the case of the catalysts produced in examples 1, 2 and 3, which were produced using SAPO-34, this catalyst, too, was examined in the temperature-programmed reduction by means of hydrogen by the method indicated above. FIG. 6 shows the TPR graph obtained, displaying the characteristic TPR peak at 230° C.

The invention claimed is:

1. A method of improving the catalytic activity of a copper-promoted zeolitic catalyst having a chabazite structure, wherein a zeolitic catalyst having a chabazite structure is treated with a copper salt solution and subsequently treated thermally under oxizing conditions in order to form the copper-promoted zeolitic catalyst having a chabazite structure which in the temperature-programmed reduction (TPR) by means of hydrogen at a heating rate of 10 K/min and a hydrogen content in the test gas of 5% by volume has a signal in the temperature range from 230° C. to 240° C., where the weight used in the TPR is such that the sample to be examined contains from 3 to 8 milligram of copper calculated as metal.

2. The method as claimed in claim 1 wherein the zeolitic catalyst having a chabazite structure is SAPO-34 which in the temperature-programmed reduction (TPR) by means of hydrogen at a heating rate of 10 K/min and a hydrogen content in the test gas of 5% by volume has a signal at 2.40° C., where the weight used in the TPR is such that the sample to be examined contains from 3 to 8 milligram of copper calculated as metal.

3. The method as claimed in claim 1, wherein the zeolitic catalyst having a chabazite structure is chabazite (CHA) which in the temperature-programmed reduction (TPR) by means of hydrogen at a heating rate of 10 K/min and a hydrogen content in the test gas of 5% by volume has a signal at 230° C., where the weight used in the TPR is such that the sample to be examined contains from 3 to 8 milligram of copper calculated as metal.

4. The method as claimed in claim 1, wherein the copper salt solution is a compound selected from among copper(II) sulfate, copper(II) nitrate, copper(II) acetate and copper(II) acetylacetonate dissolved in water and/or a polar solvent selected from the group consisting of acetylacetone, short-chain alcohols having up to three carbon atoms, acetonitrile, acetone, dimethyl sulfoxide (DMSO), methyl ethyl ketone and mixtures thereof.

5. The method as claimed in claim 1, wherein the thermal treatment is carried out under oxidizing conditions by calcination in air at a temperature in the range from 600° C. to 900° C.

6. The method as claimed in claim 1, wherein the copper compound is present in amounts of from 0.1 to 20% by weight, calculated as copper and based on the total amount of copper and zeolite or zeolite-like compound having a chabazite structure, in the resulting copper-exchanged zeolite or in the resulting copper-exchanged zeolite-like compound having a chabazite structure.

7. A copper-promoted zeolitic catalyst having a chabazite structure which is obtained by the method of claim 1.

8. A process for the reduction of nitrogen oxides in an exhaust gas stream, wherein a copper-promoted zeolitic catalyst having a chabazite structure as claimed in claim 7 is brought into contact with the $NH_3$-containing exhaust gas stream.

* * * * *